US008284476B2

(12) United States Patent
Griffiths

(10) Patent No.: US 8,284,476 B2
(45) Date of Patent: Oct. 9, 2012

(54) BACKLIGHT UTILIZING DESICCANT LIGHT TURNING ARRAY

(75) Inventor: Jonathan Charles Griffiths, Fremont, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 244 days.

(21) Appl. No.: 12/636,040

(22) Filed: Dec. 11, 2009

(65) Prior Publication Data

US 2011/0141547 A1 Jun. 16, 2011

(51) Int. Cl.
*G02B 26/00* (2006.01)
(52) U.S. Cl. .................................................. 359/291
(58) Field of Classification Search .......... 359/290–292, 359/223, 224, 237, 245, 248, 254; 385/1, 385/16, 18, 50, 129, 130, 132
See application file for complete search history.

(56) References Cited

U.S. PATENT DOCUMENTS

| 5,947,578 | A | 9/1999 | Ayres |
| 7,285,327 | B2 * | 10/2007 | Mimura et al. ............ 428/319.3 |
| 2002/0126364 | A1 * | 9/2002 | Miles ........................... 359/247 |
| 2006/0076632 | A1 | 4/2006 | Palmateer |
| 2006/0087230 | A1 | 4/2006 | Ghosh |
| 2007/0001591 | A1 | 1/2007 | Tanaka |
| 2007/0242341 | A1 | 10/2007 | Natarajan et al. |
| 2009/0085480 | A1 | 4/2009 | Sakai |

FOREIGN PATENT DOCUMENTS

| EP | 0609816 | 8/1994 |
| EP | 1510837 | 3/2005 |
| EP | 1640331 | 3/2006 |

OTHER PUBLICATIONS

Lee et al. "Effect of transparent film desiccant on the lifetime of top-emitting active matrix organic light emitting diodes," *Applied Physics Letters*, v. 90, n 10, 2007, American Institute of Physics. (3 pages).
International Search Report and Written Opinion dated Feb. 3, 2011, from Application No. PCT/US2010/058423.

* cited by examiner

*Primary Examiner* — Ricky Mack
*Assistant Examiner* — Tuyen Tra
(74) *Attorney, Agent, or Firm* — Weaver Austin Villeneuve & Sampson LLP

(57) ABSTRACT

An interferometric display comprises a backlight with light extraction features formed from a desiccant material within the display. A light source is positioned at one or more edges or corners of the back glass, and the desiccant based features patterned in or on the back glass remove unwanted moisture and create uniform light extraction from the back glass.

21 Claims, 10 Drawing Sheets

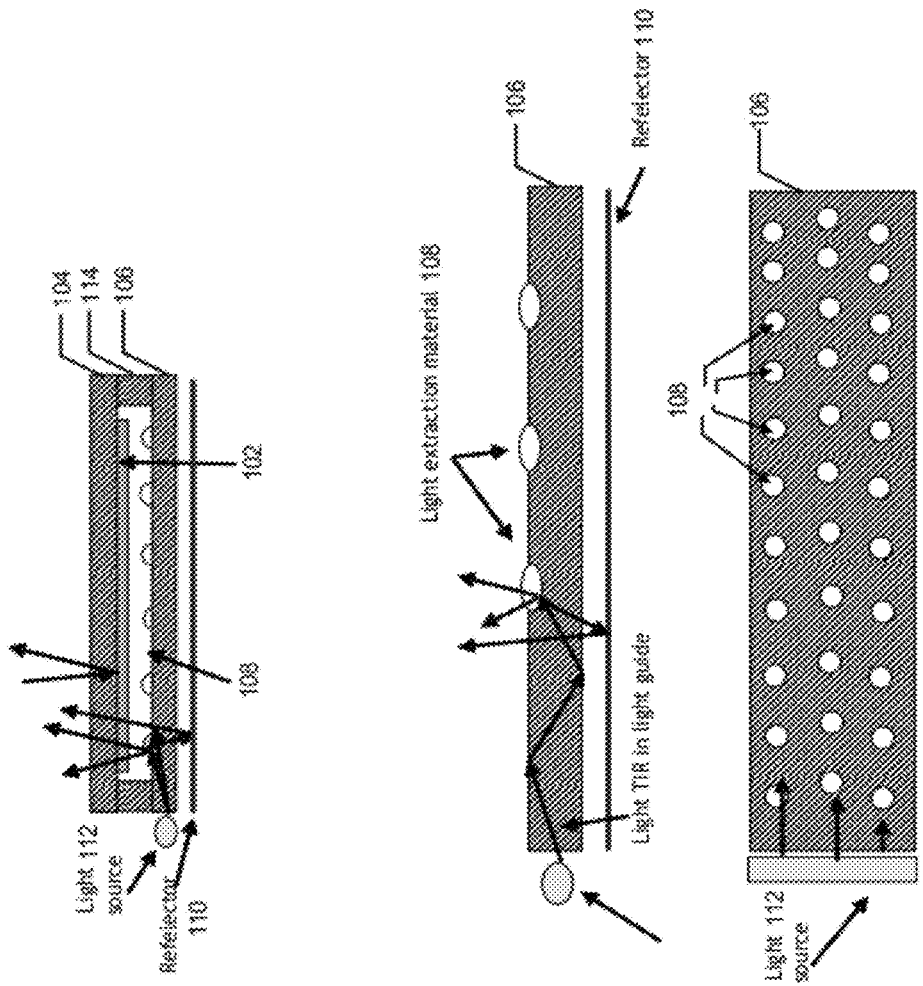

BACKLIGHT UTILIZING DESICCANT LIGHT TURNING ARRAY

BACKGROUND

Description of Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In an interferometric display, light extraction features are formed from a desiccant material within the display, and the desiccant thus serves as a dual purpose material. Desiccant based features patterned in or on a rear substrate also referred to as the "back glass," remove unwanted moisture and create uniform light extraction from the back glass. In various embodiments, a light source is positioned at one or more edges or corners of the back glass. Light from the light source is guided by the principle of total internal reflection ("TIR") within the back glass until it reaches a desiccant based diffusive feature, where it is scattered forward and back, breaking the TIR. The back glass thus acts as a light guide and allows the area behind/under the array and back glass to be used for a backlight. This is in contrast to prior designs where desiccant formed a non transmissive area and prevented use of a backlight.

One aspect relates to an apparatus comprising: a first substantially transparent substrate disposed at a front side of the display; an array of interferometric modulation elements disposed on the first substantially transparent substrate, the interferometric modulation elements comprising two layers that define a cavity, a first layer being movable relative to a second layer through a range of positions, the layers causing the cavity to operate interferometrically in at least one of the positions, producing a predetermined optical response to visible light; and a plurality of electrodes configured for conducting electrical signals to the array of interferometric modulation elements. The apparatus further comprises: control circuitry configured to apply electrical signals for controlling the array of interferometric modulation elements via the plurality of electrodes; a second substrate disposed at a back portion of the display; a light source located at an edge of the second substrate; and a plurality of light turning features upon and/or in the second substrate, the light turning features formed of a desiccant and arranged upon and/or in the second substrate so as to act as a light guide and transmit the light received at the edge away from a face of the substrate and towards the array of interferometric modulation elements.

Another aspect relates to a method of making an interferometric display. The method comprises: providing a first substantially transparent substrate disposed at a front side of the display; providing an array of interferometric modulation elements disposed on the first substantially transparent substrate, the interferometric modulation elements comprising two layers that define a cavity, a first layer being movable relative to a second layer through a range of positions, the layers causing the cavity to operate interferometrically in at least one of the positions, producing a predetermined optical response to visible light; and providing a plurality of electrodes configured for conducting electrical signals to the array of interferometric modulation elements. The method further comprises: providing control circuitry configured to apply electrical signals for controlling the array of interferometric modulation elements via the plurality of electrodes; providing a second substrate disposed at a back portion of the display; providing a light source located at an edge of the second substrate; and providing a desiccant upon and/or in the second substrate, the desiccant arranged upon and/or in the second substrate so as to act as a light guide and transmit the light received at the edge away from a face of the substrate and towards the array of interferometric modulation elements.

A further understanding of the nature and advantages of the present invention may be realized by reference to the remaining portions of the specification and the drawings.

BRIEF DESCRIPTION OF THE DRAWINGS

FIG. 8 is a cross section of another alternative embodiment of an interferometric modulator with an integrated backlight.

FIG. 9A is a cross section of the backlight and other components of FIG. 8.

FIG. 9B is a top view of the backlight and other components of FIG. 8

DETAILED DESCRIPTION OF THE PREFERRED EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In an interferometric display, light extraction features are formed from a desiccant material within the display, and the desiccant thus serves as a dual purpose material. Desiccant based features patterned in or on a rear substrate also referred to as the "back glass," remove unwanted moisture and create uniform light extraction from the back glass. In various embodiments, a light source is positioned at one or more edges or corners of the back glass. Light from the light source is guided by the principle of total internal reflection ("TIR") within the back glass until it reaches a desiccant based diffusive feature, where it is scattered forward and back, breaking the TIR. The back glass thus acts as a light guide and allows the area behind/under the array and back glass to be used for a backlight. This is in contrast to prior designs where desiccant formed a non transmissive area and prevented use of a backlight.

Figure 1:
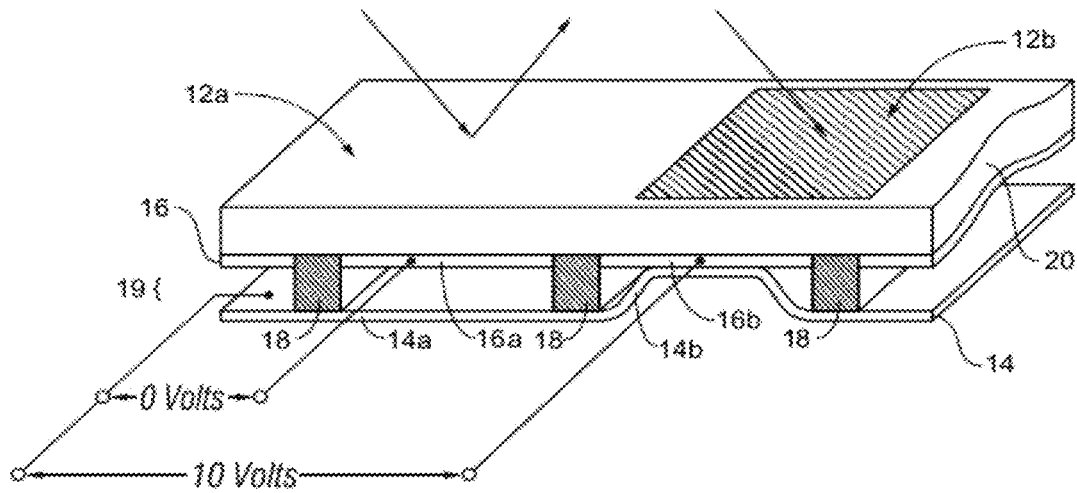
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
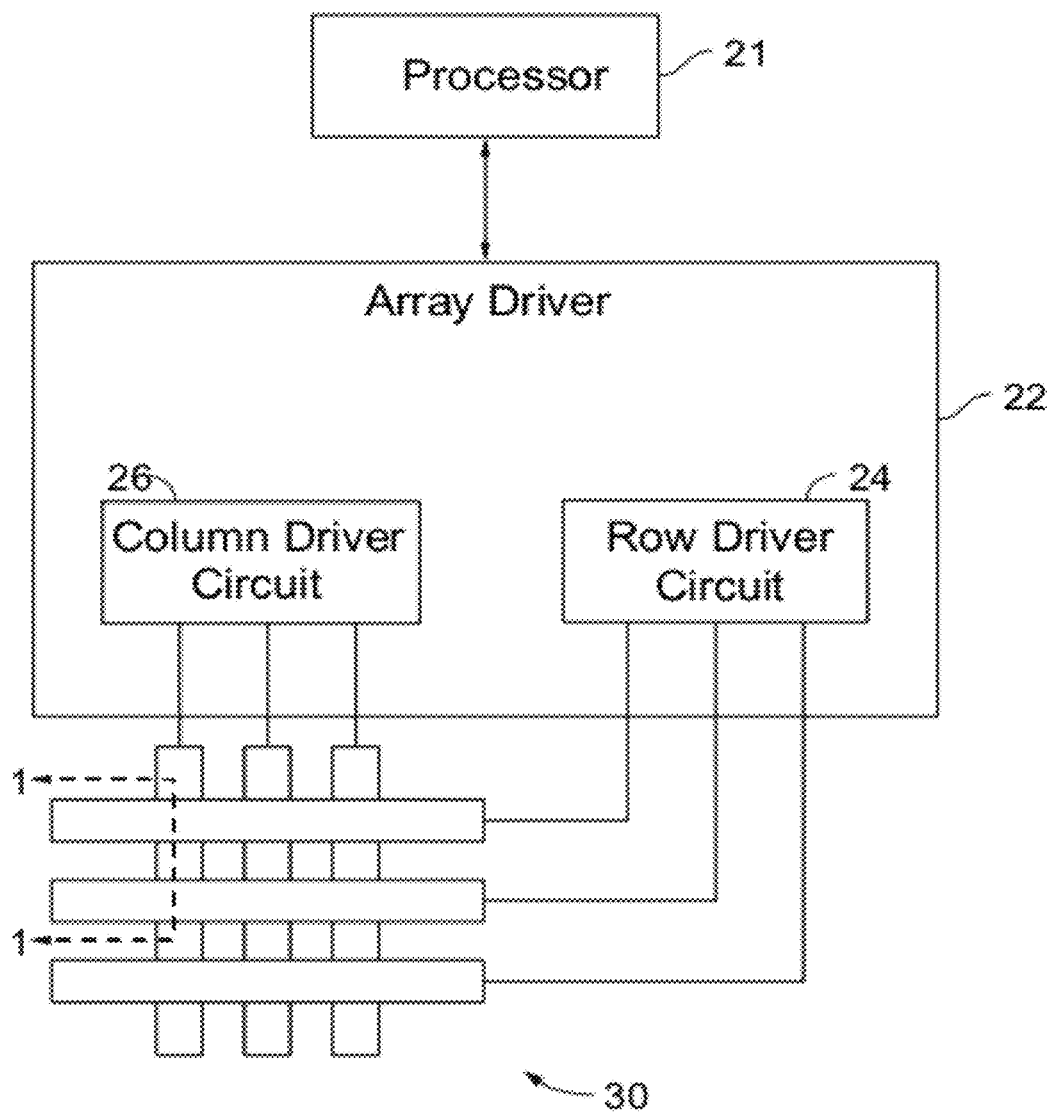
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
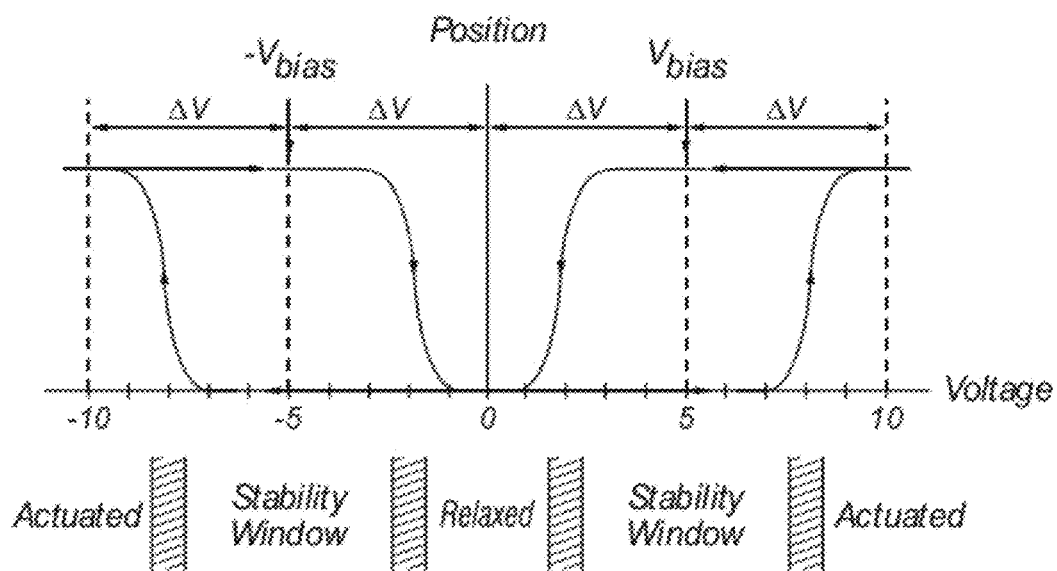
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
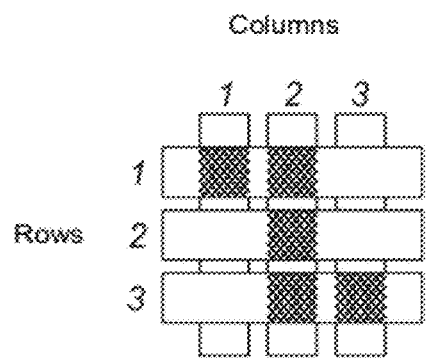
FIGS. 5A and 5B illustrate one exemplary timing diagram for row and column signals that may be used to write a frame of display data to the 3×3 interferometric modulator display of FIG. 2.
Figure 5B:
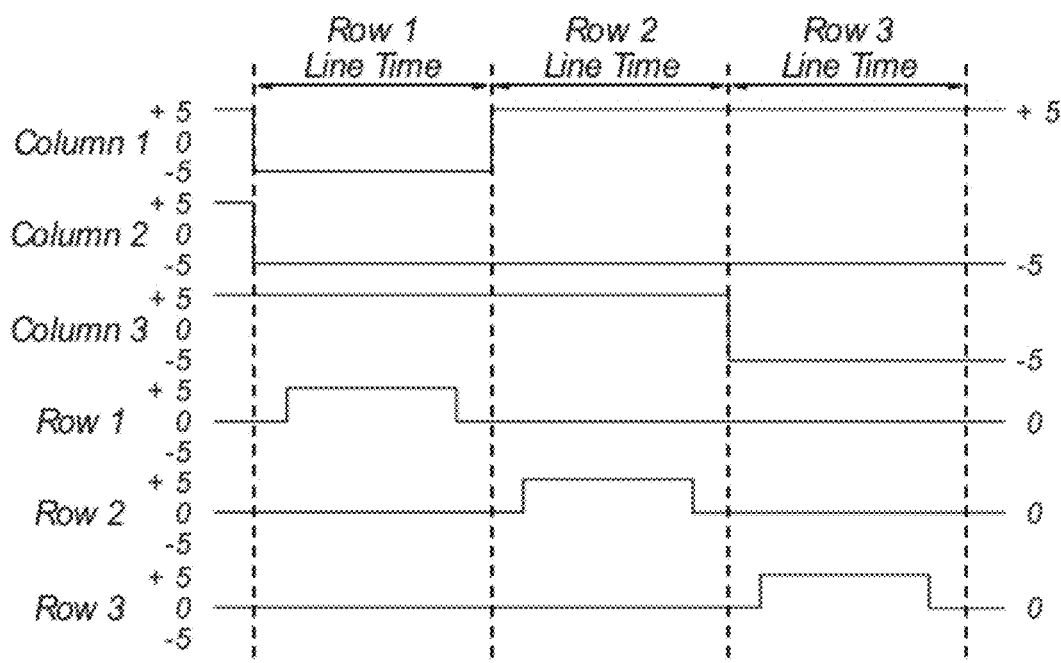

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
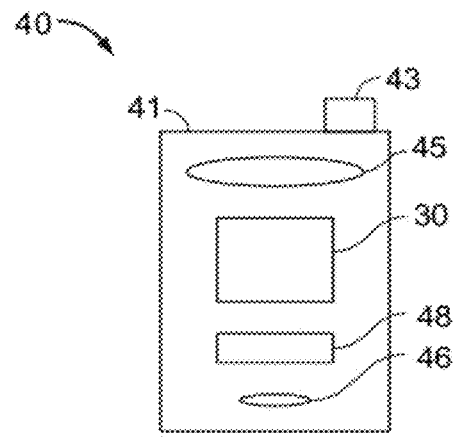
FIGS. 6A and 6B are system block diagrams illustrating an embodiment of a visual display device comprising a plurality of interferometric modulators.
Figure 6B:
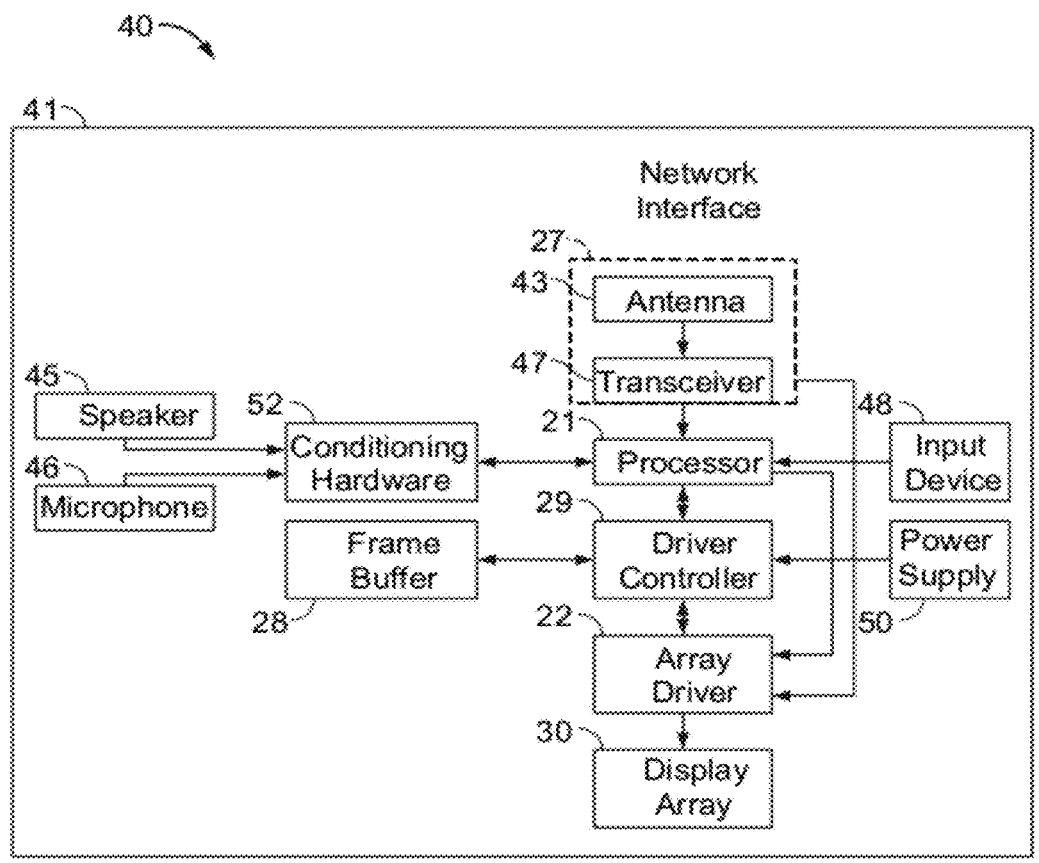

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
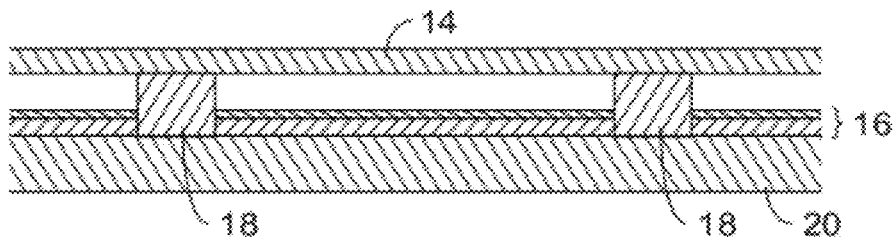
FIG. 7A is a cross section of the device of FIG. 1.
Figure 7B:
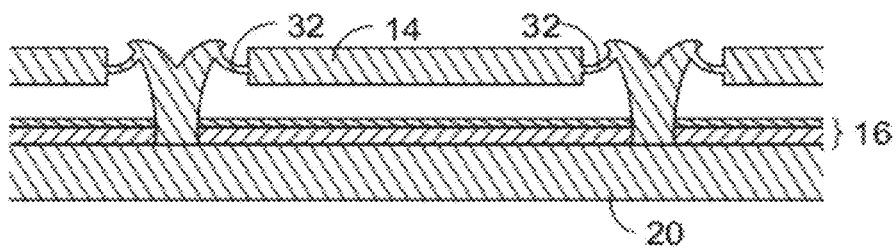
FIG. 7B is a cross section of an alternative embodiment of an interferometric modulator.
Figure 7C:
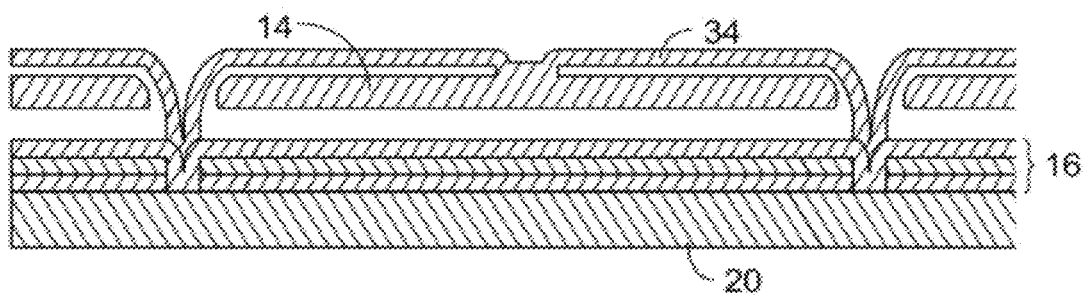
FIG. 7C is a cross section of another alternative embodiment of an interferometric modulator.
Figure 7D:
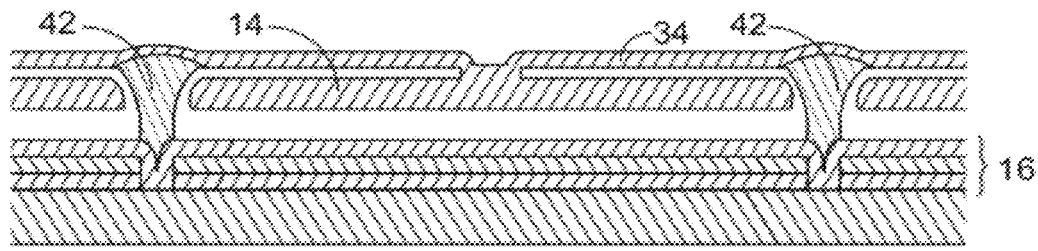
FIG. 7D is a cross section of yet another alternative embodiment of an interferometric modulator.
Figure 7E:
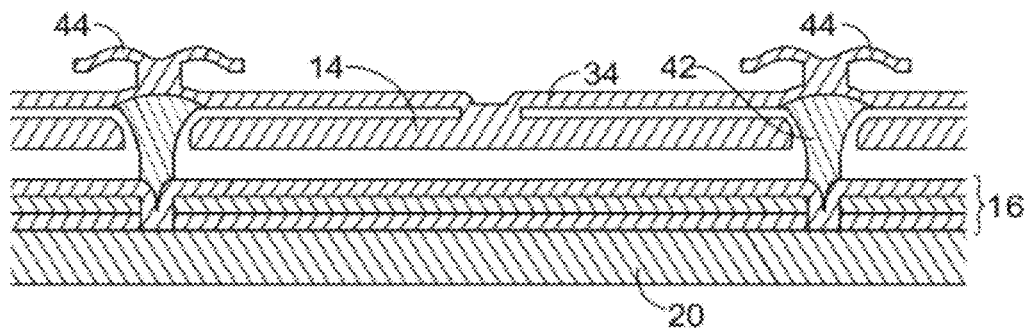
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

FIG. 8 is a cross section of another alternative embodiment of device comprising an interferometric modulator and an integrated backlight. FIG. 9A is a cross section of the backlight and other components of FIG. 8. FIG. 9B is a top view of the backlight and other components of FIG. 8. A transflective IMOD array 102 is shown between front glass 104 and back glass 106. A light source 112 is positioned at the edge of the back glass 106 and the back glass 106 acts as a total internal reflector ("TIR") or light guide as the light passes through the glass, until the light reaches a diffusive feature where it is scattered both towards the front (direction of front glass 104) and rear of the device. An array of diffusive features 108 is formed upon or in the surface of back glass 106. A reflector 110 may in some embodiments be placed behind/below the light guide to re-direct light escaping from the back toward the front. Light source 112 may be located on one side, two sides, four sides, or at a corner of the back glass 106 and overall device. The light source may be a point source such as a light emitting diode or may be light bar as shown at the left side of FIG. 9B. IMOD array 102 may in one embodiment be completely reflective rather than transflective, and the light from light source 112 may be directed to another adjacent display. Referring to FIG. 1, for a transflective IMOD array, an aluminum layer, 14 may be used in the pixels and is preferably less than about 100 angstroms thick. For example, a layer about 70 angstroms thick is about fifty percent reflective and considered transflective. Referring to FIG. 1, in some embodiments, reflective layer 14, may consist of a multilayer structure, in which a transparent supporting mechanical layer, such as a dielectric, is used to provide mechanical support to one or more thin transflective layers, such as thin layers of Aluminum. In some embodiments a transflective IMOD array may be designed to be both illuminated with ambient light from the front or the backlight from the rear, or a combination of the two light sources.

Moisture within an IMOD display is problematic and desiccant may be utilized to remove free moisture. Embodiments facilitate reducing the thickness of the display and device by utilizing desiccant as the light extraction material 108. In other words, the light turning features 108 are made of desiccant. The desiccant thus serves two purposes, eliminating moisture and directing the light to the active display(s) and/or display components. This reduces or eliminates the need for providing wells/cavities or otherwise accommodating desiccant within the display, or the need for an external backlight guiding and turning array. Displays made in accordance with the disclosed embodiments may therefore be thinner than prior displays and enable the production of thinner electronic devices such as cellular telephones etc.

Additionally, in prior devices the desiccant is in the form of a large opaque patch on the back glass. This makes usage of a back light on the opposite side of the back glass problematic if not impossible. This disclosed embodiments also overcome this obstacle and facilitate usage of a back light. Usage of a back light is advantageous because a back light has none of the through view optical requirements needed in a front light. For example, simple front lights in the direct view path may expose delicate prismatic features on the front surface.

A back light may be used not only with a transflective IMOD array, but also with other IMOD arrays having sufficient gaps within the pixel structure that allow light to pass from the back to the front where it can be turned down onto the array. Indeed, such a hybrid light turning array and desiccant may be utilized with any display and to utilize a single light source for multiple displays, such as back to back displays seen in FIG. 10.

CaO is an example of a (white) diffusive desiccant material with a high refractive index able to extract light out of the substrate, i.e. to break the TIR of light guided within a lower refractive index substrate, such as glass, to extract light out of the substrate. Some zeolites may also be suitable as a dual use light turning/desiccant material. The light extracting desiccant array 108 can be printed in the appropriate pattern to create uniform light extraction on the back glass, thus suitable for use as a light guide. Various patterns are possible, depending the location and orientation of the light source. Array 108 may be printed with an ink jet printer or may be screen printed. Alternatively the array may be provided as an adhesive patch or may be formed by selective abrasion. In another embodiment, material may be directed toward the surface of the substrate (a.k.a. back glass) at an appropriate velocity such that some material will embed itself within the glass. The embedded material will then scatter and diffuse light where embedded. A mask may be used to prevent or limit embedding in certain areas, and to create a desired pattern. In addition to employing a desiccant light turning array, in some embodiments the back glass may be selectively sandblasted to form regions that are abraded and scatter and diffuse light.

However produced, the density and arrangement of light turning features may be evenly distributed or may be made to intentionally vary along the surface.

Figure 10:
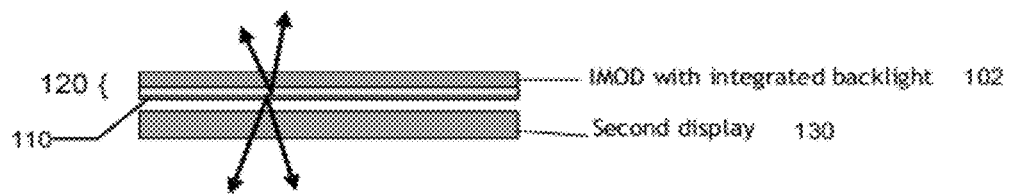
FIG. 10 is a cross section of a multi display embodiment.

FIG. 10 is a cross section of a multi display embodiment. IMOD display 102 is shown with backlight 112, and utilizes desiccant array 108 (not shown) such as that previously described. A partially reflective layer 110 may also be employed in certain embodiments, although it is contemplated that other embodiments will not have such a layer. A second display 130 utilizes back light 120 (light source 112 and light guide/back glass 106) for illumination. Such back to back stacking reduces the overall Z height of the device, which is of critical importance in electronic device designs.

Figure 11:
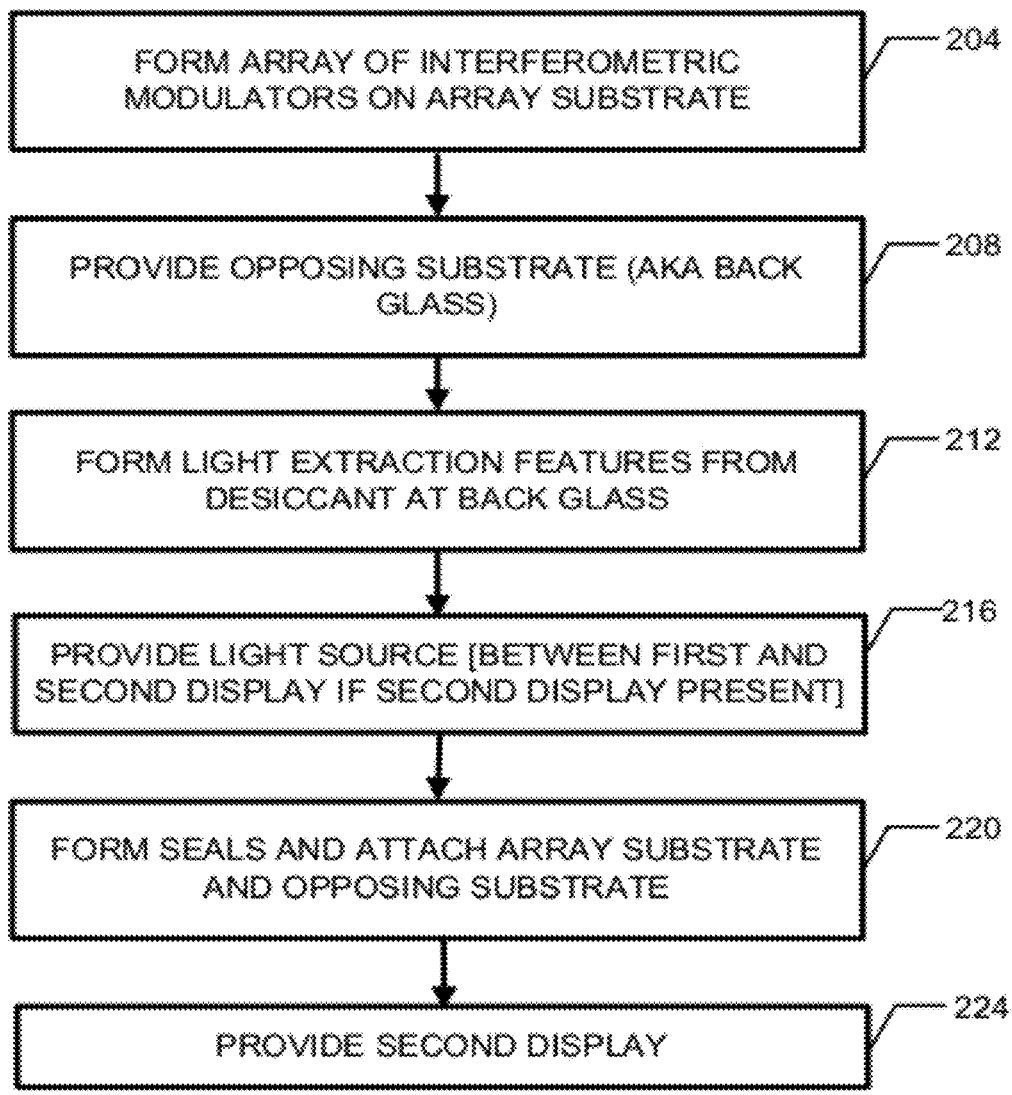
FIG. 11 is a flow chart depicting an overview of device fabrication.

FIG. 11 is a flow chart depicting an overview of device fabrication. The following steps are not necessarily in the order described. In step 204, the array of interferometric modulators is formed at a first or "array" substrate as previously described. Then in step 208, the rear or opposing substrate (e.g. back glass) is provided. In step 212 desiccant in the form of light extraction features is provided upon or in the back glass. In step 216 the light source is provided. In step 230 the seals are formed and the array substrate is attached to the back glass (opposing substrate). Then in step 224, in embodiments where a second display is present, the second display is provided While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An apparatus, comprising:
   an optical waveguide;
   a light source configured to provide light to the optical waveguide;
   desiccant material disposed upon and/or in the optical waveguide and configured to extract light from the optical waveguide; and
   an array of interferometric light modulators, wherein the desiccant material is further configured to provide at least some light extracted from the optical waveguide to the array of interferometric light modulators.

2. The apparatus of claim 1, wherein the array of interferometric light modulators include transflective modulators, and wherein the light passes in part through the transflective modulators.

3. The apparatus of claim 1, wherein the array of light modulators are constructed with gaps between some of the array of modulators, and wherein light passes through the gaps.

4. The apparatus of claim 1, wherein the wave guide is substantially planar, and includes opposing primary faces and side surfaces.

5. The apparatus of claim 4, wherein the light source is positioned at one of the side surfaces, and wherein the desiccant is positioned at one of the opposing primary faces that is adjacent the array of interferometric light modulators.

6. A display apparatus, comprising:
   a first substantially transparent substrate disposed at a front side of the display;
   an array of interferometric modulation elements disposed on the first substantially transparent substrate, the interferometric modulation elements including two layers that define a cavity, a first layer being movable relative to a second layer through a range of positions, the layers causing the cavity to operate interferometrically in at least one of the positions, producing an optical response to visible light;
   a plurality of electrodes configured for conducting electrical signals to the array of interferometric modulation elements;
   control circuitry configured to apply electrical signals for controlling the array of interferometric modulation elements via the plurality of electrodes;
   a second substrate disposed at a back portion of the display;
   a light source located at an edge of the second substrate; and
   a plurality of light turning features upon and/or in the second substrate, the light turning features formed of a desiccant and arranged upon and/or in the second substrate so as to act as a light guide and transmit the light received at the edge away from a face of the substrate and towards the array of interferometric modulation elements.

7. The display apparatus of claim 6, wherein the desiccant is at least partially embedded into the second substrate.

8. The display apparatus of claim 6, wherein the desiccant is formed in an array of desiccant patches, the array having a substantially uniform density of patches across the face of the second substrate.

9. The display apparatus of claim 6, wherein the desiccant is formed in an array of desiccant patches, the array having a density that varies across the second substrate.

10. A method of making an interferometric display, comprising:

providing a first substantially transparent substrate disposed at a front side of the display;

providing an array of interferometric modulation elements disposed on the first substantially transparent substrate, the interferometric modulation elements including two layers that define a cavity, a first layer being movable relative to a second layer through a range of positions, the layers causing the cavity to operate interferometrically in at least one of the positions, producing an optical response to visible light;

providing a plurality of electrodes configured for conducting electrical signals to the array of interferometric modulation elements;

providing control circuitry configured to apply electrical signals for controlling the array of interferometric modulation elements via the plurality of electrodes;

providing a second substrate disposed at a back portion of the display;

providing a light source located at an edge of the second substrate; and providing a desiccant upon and/or in the second substrate, the desiccant arranged upon and/or in the second substrate so as to act as a light guide and transmit the light received at the edge away from a face of the substrate and towards the array of interferometric modulation elements.

11. The method of claim 10, wherein providing the desiccant involves screen printing the desiccant upon the second substrate.

12. The method of claim 10, wherein providing the desiccant involves ink jet printing the desiccant upon the second substrate.

13. The method of claim 10, wherein providing the desiccant involves partially embedding the desiccant into the second substrate.

14. The method of claim 10, wherein providing the desiccant involves abrading a surface of the second substrate with the desiccant and embedding some portion of the desiccant into the surface of the second substrate.

15. The method of claim 10, wherein providing the desiccant involves providing an array of desiccant patches, the array having a substantially uniform density of patches across the face of the substrate.

16. The method of claim 10, wherein providing the desiccant involves providing an array of desiccant patches, the array having a density of patches that varies across the face of the substrate.

17. A display apparatus, comprising:

a first substantially transparent substrate disposed at a front side of the display;

an array of interferometric modulation elements disposed on the first substantially transparent substrate, the interferometric modulation elements including two layers that define a cavity, a first layer being movable relative to a second layer through a range of positions, the layers causing the cavity to operate interferometrically in at least one of the positions, producing an optical response to visible light;

a plurality of electrodes configured for conducting electrical signals to the array of interferometric modulation elements;

control circuitry configured to apply electrical signals for controlling the array of interferometric modulation elements via the plurality of electrodes;

a second substrate disposed at a back portion of the display;

means for removing moisture within the display apparatus, the means for removing moisture configured to extract light from a light guide and direct the light towards the array of interferometric modulation elements.

18. The display apparatus of claim 17, wherein the means for removing moisture includes desiccant material.

19. The display apparatus of claim 18, wherein the desiccant material is at least partially embedded into the second substrate.

20. The display apparatus of claim 18, wherein the desiccant material is formed in an array of desiccant patches, the array having a substantially uniform density of patches across the face of the second substrate.

21. The display apparatus of claim 18, wherein the desiccant material is formed in an array of desiccant patches, the array having a density that varies across the second substrate.

* * * * *